(12) United States Patent
Hammond et al.

(10) Patent No.: US 7,870,038 B1
(45) Date of Patent: Jan. 11, 2011

(54) SYSTEM AND METHOD FOR MANAGING ELECTRONIC CATALOGS WITHIN AN ENTERPRISE

(75) Inventors: Jeffrey T Hammond, Anthem, AZ (US); Dean M Kerl, Gilbert, AZ (US); Courtney A Licardi, Peoria, AZ (US); Becky J Sutton, Peoria, AZ (US); Martin Tarvydas, Bellevue, WA (US)

(73) Assignee: American Express Travel Related Services Company, Inc., New York, NY (US)

( * ) Notice: Subject to any disclaimer, the term of this patent is extended or adjusted under 35 U.S.C. 154(b) by 1244 days.

(21) Appl. No.: 10/908,296

(22) Filed: May 5, 2005

Related U.S. Application Data

(60) Provisional application No. 60/521,506, filed on May 7, 2004.

(51) Int. Cl.
G06F 17/30 (2006.01)
G07F 7/00 (2006.01)
(52) U.S. Cl. .......................................... 705/27; 705/26
(58) Field of Classification Search .................. 705/26, 705/27
See application file for complete search history.

(56) References Cited

U.S. PATENT DOCUMENTS

| | | | |
|---|---|---|---|
| 5,231,566 A * | 7/1993 | Blutinger et al. | ............... 705/27 |
| 5,319,542 A | 6/1994 | King, Jr. et al. | |
| 5,367,622 A | 11/1994 | Coggins | |
| 5,528,490 A | 6/1996 | Hill | |
| 5,675,784 A | 10/1997 | Maxwell et al. | |
| 5,721,832 A | 2/1998 | Westrope et al. | |
| 5,740,425 A | 4/1998 | Povilus | |
| 5,897,639 A | 4/1999 | Greef et al. | |
| 5,970,471 A | 10/1999 | Hill | |
| 6,023,683 A | 2/2000 | Johnson et al. | |
| 6,032,130 A | 2/2000 | Alloul et al. | |
| 6,055,516 A | 4/2000 | Johnson et al. | |
| 6,072,481 A | 6/2000 | Matsushita et al. | |
| 6,115,641 A | 9/2000 | Brown et al. | |
| 6,128,600 A | 10/2000 | Imamura et al. | |
| 6,131,088 A | 10/2000 | Hill | |
| 6,578,030 B1 | 6/2003 | Wilmsen et al. | |
| 6,687,557 B2 | 2/2004 | Ouchi | |
| 6,728,706 B2 | 4/2004 | Aggarwal et al. | |
| 6,751,600 B1 | 6/2004 | Wolin | |
| 7,133,882 B1 * | 11/2006 | Pringle et al. | ............ 707/104.1 |

(Continued)

OTHER PUBLICATIONS

"Leading B@B eCommerce Companies Partner with Intelligent/ Digital's Commerce O/S™ to Power Comprehensive Solutions for Vertical eMarkets" PR Newswire, Nov. 15, 1999. Retrieved via Dialog on Aug. 30, 2010.*

*Primary Examiner*—Michael Misiaszek
(74) *Attorney, Agent, or Firm*—Snell & Wilmer L.L.P.

(57) ABSTRACT

A system and method to facilitate the management of an electronic supplier catalog within an entity, wherein authorized entity employees purchase products and services relating to the operation of the entity. The system provides a product approval utility for receiving electronic catalog feeds, processing the feeds, identifying feed suppliers, identifying catalog items and comparing the items to an existing database of matching items. Matching items are compared for price, description, payment terms and the like in order to identify variances which are later provided to a commodity manager for review. The commodity manager interacts with the system to approve or reject catalog items based on identified variances.

20 Claims, 5 Drawing Sheets

U.S. PATENT DOCUMENTS

| | | |
|---|---|---|
| 7,472,077 B2 * | 12/2008 | Roseman et al. .............. 705/26 |
| 2002/0143692 A1 | 10/2002 | Heimermann et al. |
| 2003/0050859 A1 | 3/2003 | Rodriguez et al. |
| 2003/0115115 A1 | 6/2003 | Ouchi |
| 2003/0187757 A1 | 10/2003 | Ouchi |
| 2003/0195817 A1 | 10/2003 | Haegele |
| 2003/0200185 A1 | 10/2003 | Huerta et al. |
| 2004/0006571 A1 | 1/2004 | Anagol-Subbarao et al. |
| 2004/0010456 A1 | 1/2004 | Hoang |
| 2004/0015782 A1 | 1/2004 | Day et al. |
| 2004/0083135 A1 | 4/2004 | Chau |
| 2004/0153378 A1 * | 8/2004 | Perkowski .................... 705/27 |
| 2005/0261983 A1 * | 11/2005 | Etten et al. .................... 705/26 |
| 2006/0111928 A1 * | 5/2006 | Fisher et al. .................... 705/1 |
| 2008/0027830 A1 * | 1/2008 | Johnson et al. ............... 705/27 |

* cited by examiner

SYSTEM AND METHOD FOR MANAGING ELECTRONIC CATALOGS WITHIN AN ENTERPRISE

CROSS-REFERENCE TO RELATED APPLICATIONS

This application claims priority to, and the benefit of, U.S. Provisional Application Ser. No. 60/521,506 filed May 7, 2004 and entitled "Product Routing and Approval System and Method", which is hereby incorporated by reference.

FIELD OF INVENTION

The invention generally relates to electronic catalog management, and more particularly, to the creation and maintenance of reporting hierarchies within an enterprise using integrated data from a plurality of data sources within a single web service.

BACKGROUND OF INVENTION

Businesses have long appreciated the importance of proper budgeting and management of expenses. Lack of fiscal control often leads to reduced profits or even bankruptcy. An essential element of fiscal control is careful management of an enterprise's procurement activities. While each enterprise may employ various procedures to control purchases in the name of the enterprise, most enterprises assign one or more managers to ensure compliance to defined procedures. The main responsibilities of such managers include, for example, managing the purchasing behaviors of the employees of the enterprise and managing the purchasing terms relating to each supplier.

To manage both employee purchasing behaviors and purchase terms, most large enterprises provide employee access to supplier catalogs. Traditional catalogs have been replaced by electronic catalogs in recent years, wherein an employee may quickly and conveniently locate specific products and/or services. It is fairly simple for a manger to only provide access to such catalogs for approved suppliers, however, it is a much more difficult task to manage the accessibility to individual products and services which may or may not be approved for purchase. For example, an electronics manufacturer may allow engineers to purchase machinery parts from an approved supplier; however, the manufacturer may not allow the same engineers to purchase chemicals from the same supplier. If the supplier's catalog includes both machinery parts and chemicals used in electronics manufacturing, then it becomes very difficult to restrict chemical purchases.

Therefore, a need exists for a system and method for managing vendor catalogs within an enterprise to ensure that only products and services which have been approved are accessible to employees with purchasing authority. Further, a method is needed whereby catalogs can be monitored in order to alert a commodity manager when catalog information relating to a given product or service is changed. Such an alert will enable the manager to review the changes and ensure compliance with contract terms, spending limits, quality controls and the like.

SUMMARY OF INVENTION

The invention includes an online catalog management process to help manage purchasing rules within an enterprise and ensure contractual compliance. In one embodiment, the system accepts electronic catalog feeds from a supplier, parses the feed to extract individual catalog items, compares the catalog item to a corresponding item stored in a purchasing system, and notes any variances between the two items. Upon locating variances, the system notifies a procurement manager who accesses the system via a web browser to view the variances. The procurement manager may further select to approve or reject the item from the new catalog feed. If an item is rejected, the information related to the item is removed, or masked from view by purchasers. The system may be used by, for example, purchasing managers. The system may facilitate approval/rejection for new catalog items, as well as catalog items that are in production but have changed in new catalog feeds. Changes that need to be approved or rejected may include, for example, changes to price, title, description, etc. In one embodiment, purchasing managers may also be able to set catalog items as visible or invisible (i.e., obscured or masked). Visible items may be viewable to all or any subset of employees whereas invisible items may only be viewable to people with specific purchasing manager roles.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for identifying changes to a catalog feed in order to enable a manager to approve or reject changes to catalog items and thereby control access to such entries by employees with purchasing authority. The invention includes a system for comparing new catalog feed items with previously authorized like items to determine the changes. While the invention may be described in terms of an electronic supplier catalog being searched by employees and controlled by purchasing managers, any portion or all of the invention may be applicable to any online catalog. For example, the invention may be applied to an online catalog hosted by an Internet website which is searched by consumers. The invention may also apply to a government catalog, employment catalog (with job listings), classified listings, music download catalogs or any catalog including any of a variety of items (e.g., any goods, services, data or information).

Figure 1:
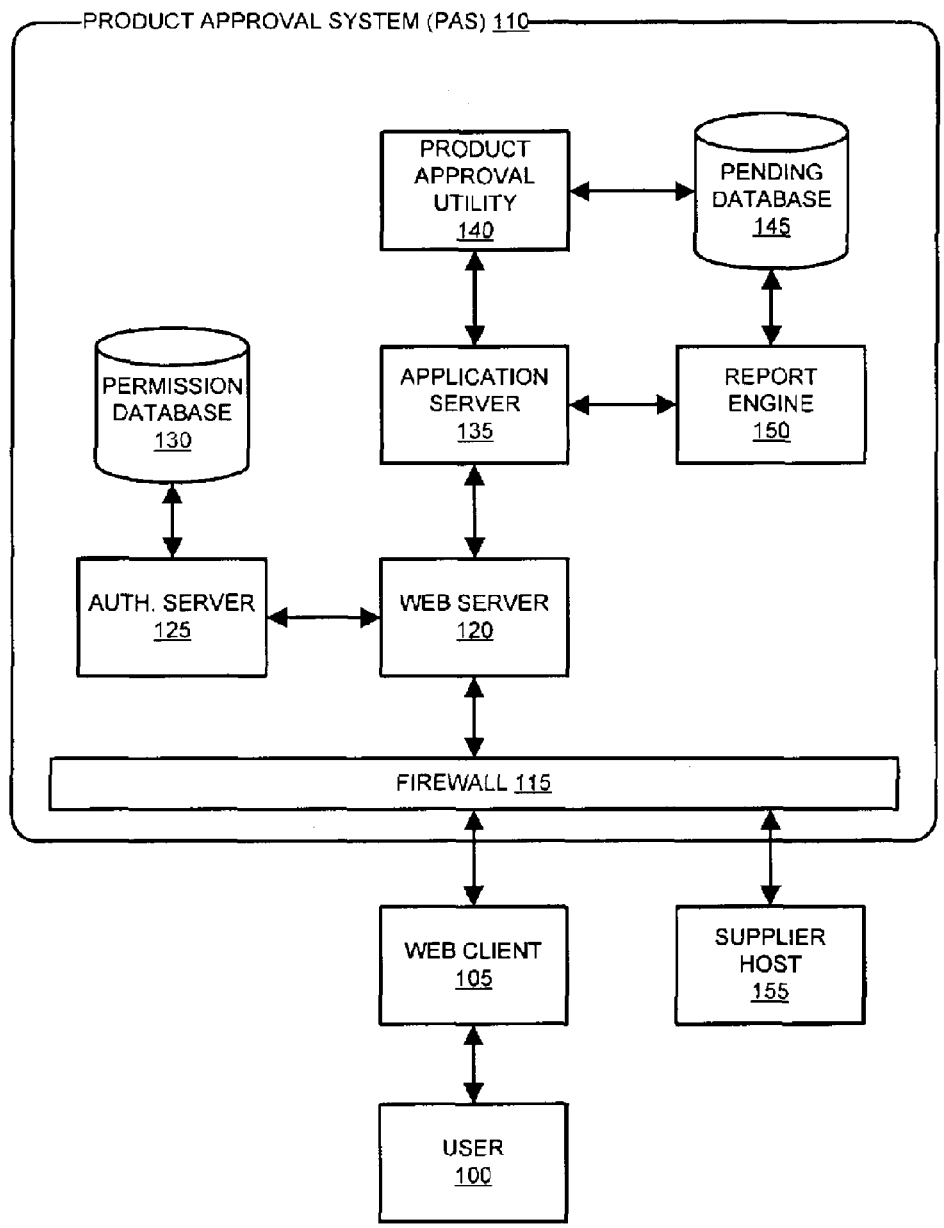
FIG. 1 is a block diagram illustrating the major system components for an exemplary system for managing product catalog access in accordance with an embodiment of the invention.

With reference to FIG. 1, in one embodiment, the system facilitates interaction between user 100 and product approval system (PAS) 110 through a web client 105. Web client 105 is connected to a web server 120 through a network connection (e.g., Internet, Intranet, LAN, WAN and the like). Web server 105 may employ an authentication server 125 in order to validate and assign proper permissions to authorized users of the system. Permission database 130 stores user credentials and permissions specific to each user. Web server 120 also employs an application server 135 to manage various applications utilized by system 110. Application server 135 may be a stand-alone server or may comprise software residing within web server 120.

In one embodiment, product approval utility 140 is invoked by application server 135 to accept a catalog feed from a supplier host 155 in order to process a catalog feed. While shown in FIG. 1 as connecting to product approval utility 140 through a web server, those skilled in the art will appreciate that supplier host 155 may connect with various components of PAS 110 either directly, or through another component. When processing catalog feeds, product approval utility 140 stores catalog items within pending database 145. Product approval utility 140 also interfaces with a report engine 150 to generate views of items stored in pending database 145. In one embodiment, report engine 150 further provides preconfigured and/or ad-hoc reports relating to one or more supplier catalogs.

In addition to the components discussed above, PAS 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; asset data; enterprise data, merchant data; financial institution data; and/or like data useful in the operation of the invention.

Figure 2A:
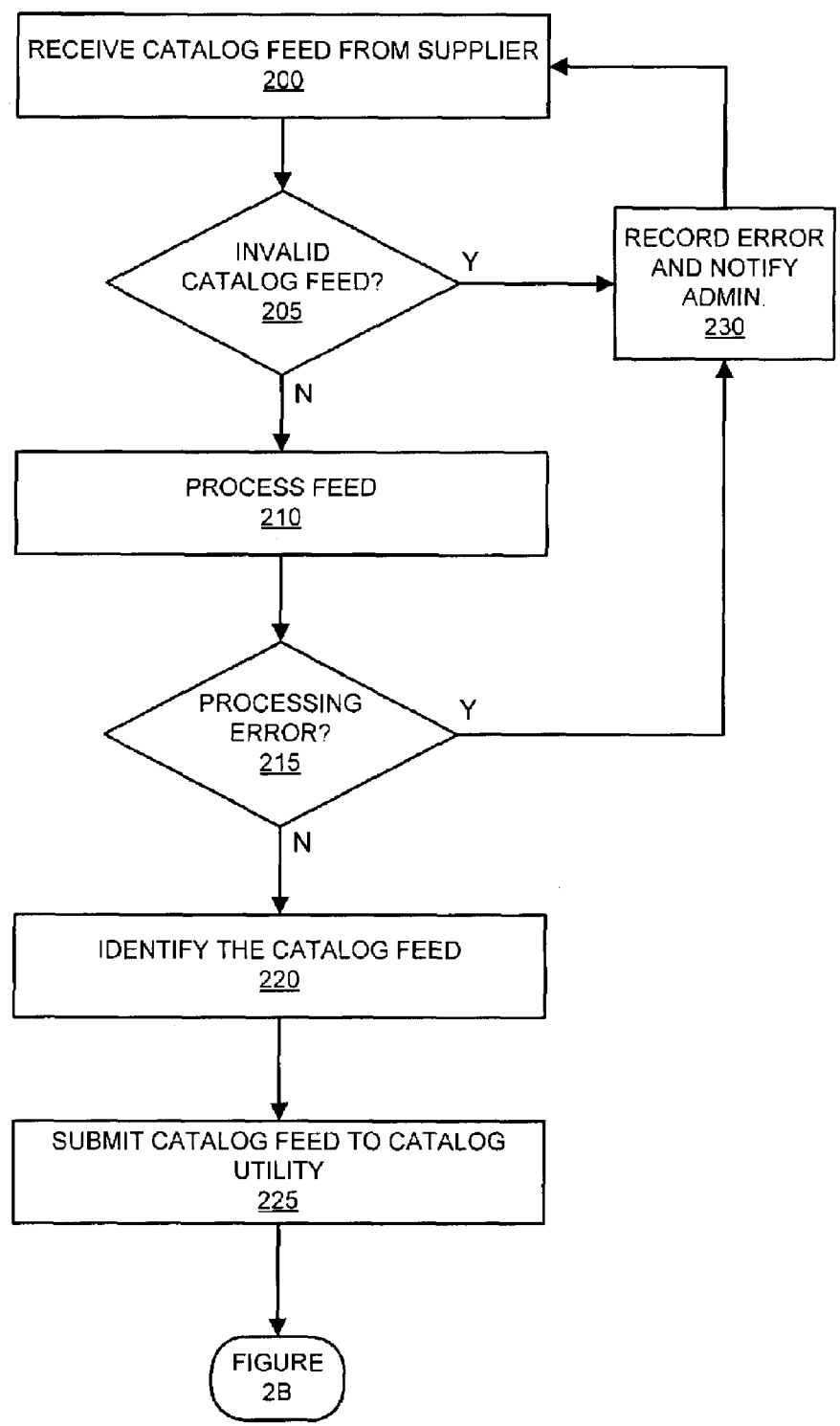
FIGS. 2A-2C is a flowchart illustrating an exemplary process for identifying variances between items of a catalog feed and corresponding pre-approved items of a procurement system in accordance with an embodiment of the invention.
Figure 2B:
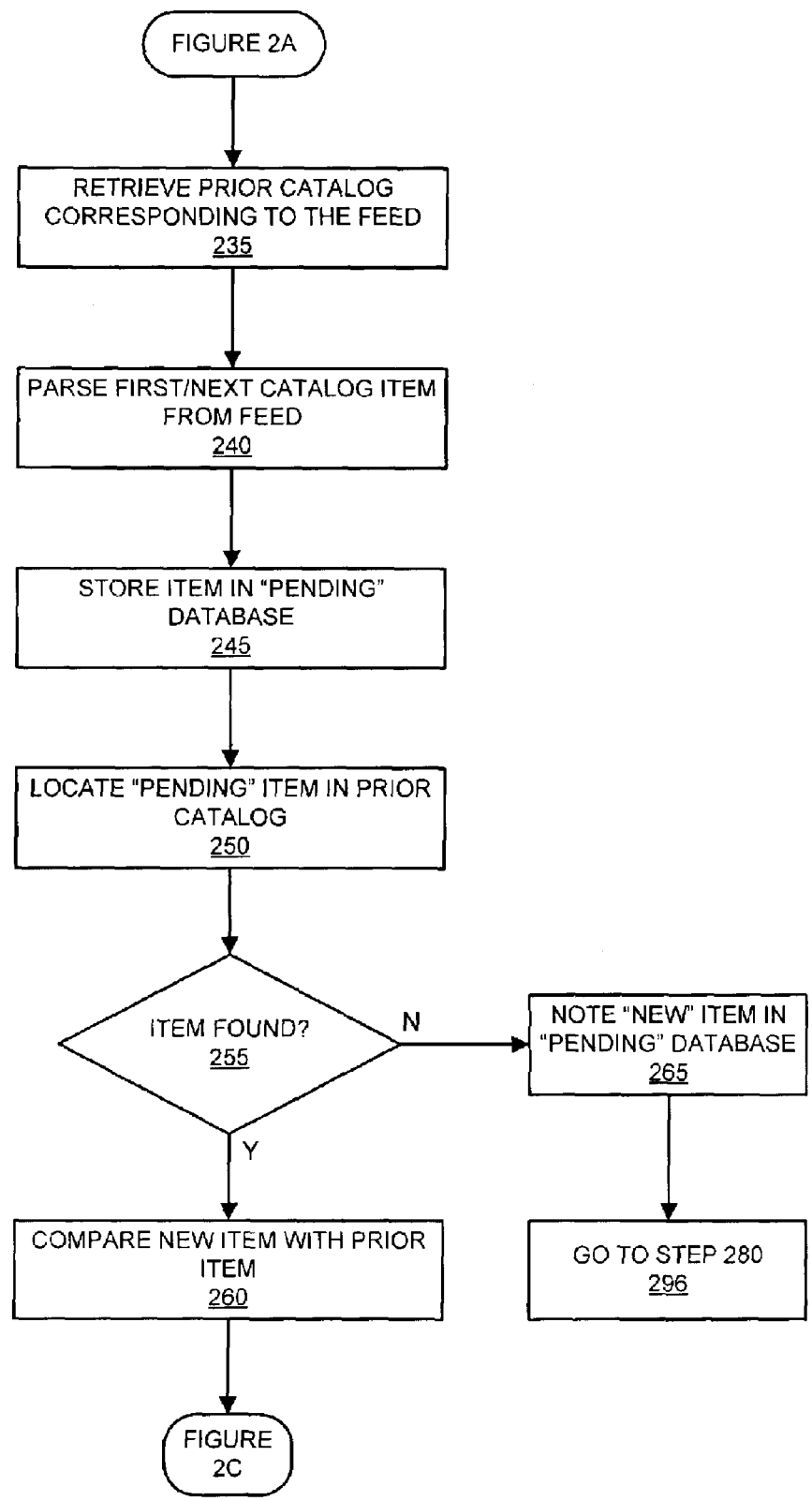
Figure 2C:
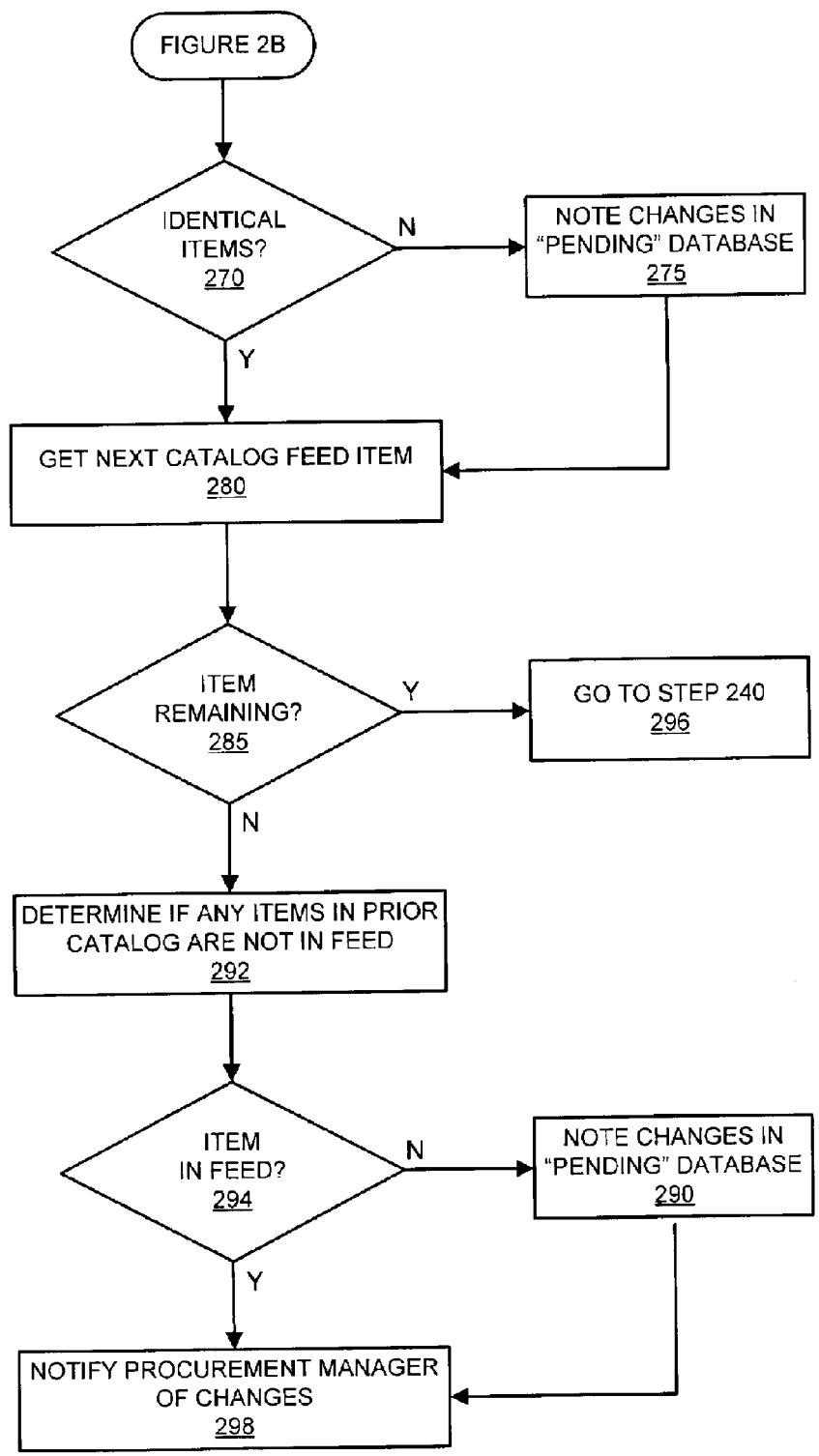
Figure 3:
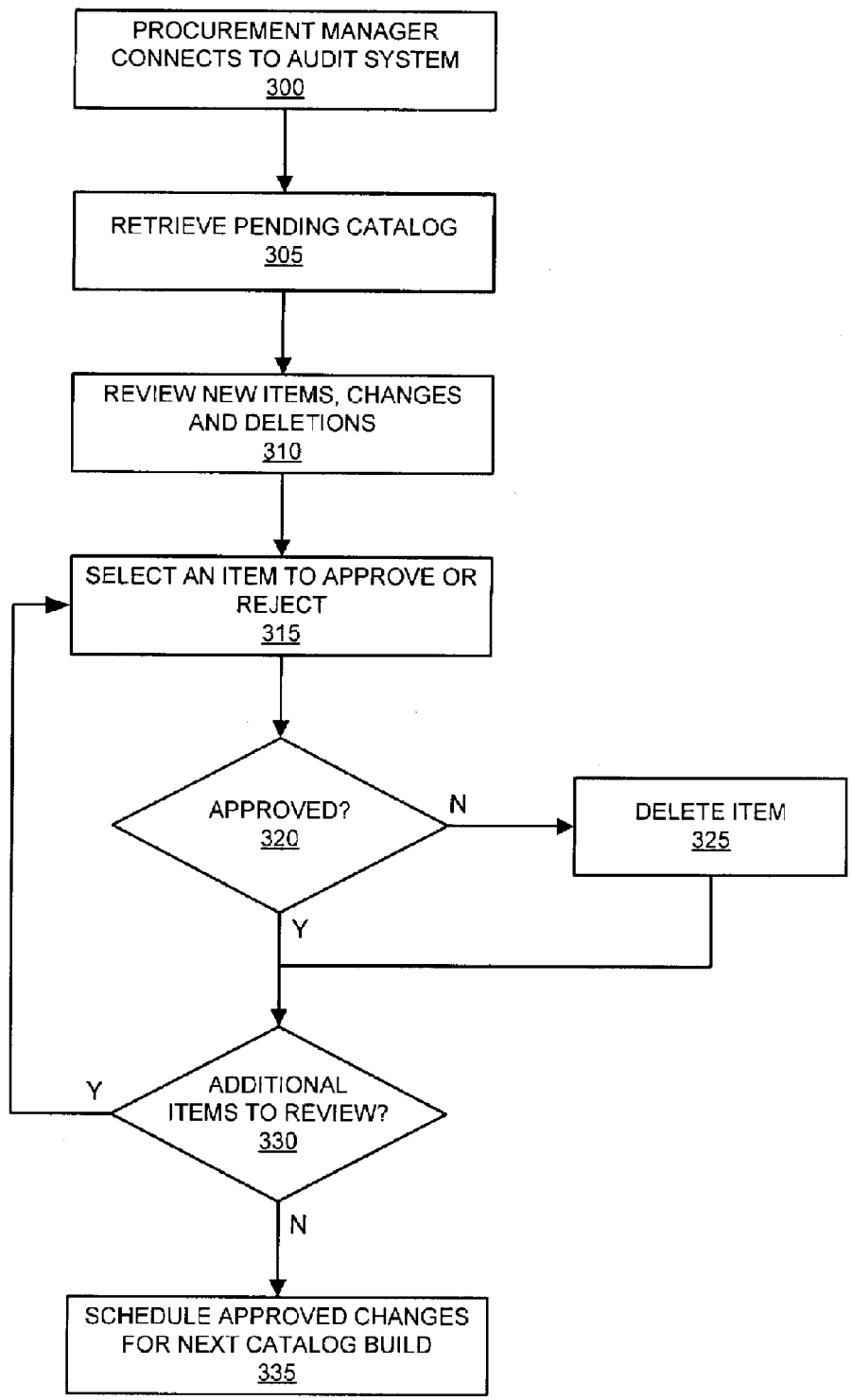
FIG. 3 is a flowchart illustrating an exemplary process for interacting with the system to review and authorize catalog variances in accordance with an embodiment of the invention.

Referring now to FIGS. 2A-3, the process flows depicted are merely embodiments of the invention and are not intended to limit the scope of the invention as described herein. For example, the steps recited in any of the method or process descriptions may be executed in any order and are not limited to the order presented. It will be appreciated that the following description makes appropriate references not only to the steps depicted in FIGS. 2A-3, but also to the various system components as described above with reference to FIG. 1.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

FIGS. 2A-2C are flowcharts illustrating an exemplary process for identifying variances between items within a catalog feed and corresponding pre-approved items of a procurement system. A supplier wishing to provide an enterprise with an electronic catalog showcasing their items provides a catalog feed to PAS 110. Upon receiving a catalog feed from a supplier (step 200), product approval utility 140 determines whether it is a proper feed (step 205). Product approval utility 140 may apply any method known in the art for analyzing a data stream to determine whether it is in an acceptable format that PAS 140 is configured to process.

If a catalog feed is determined to be invalid (step 295), then product approval utility 140 records specific information about the feed for later review by an administrator (step 230). Further, PAS 110 may employ a notification engine to generate and send an email message to an administrator or any other responsible entity alerting them to the failure in the feed. PAS 110 optionally transmits a failure message to supplier host 155 and requests transmission of a new feed (step 200). However, if the feed is determined to be in proper form and content, then product approval utility 140 processes the feed (step 210). Processing may include, for example, formatting the feed according to the requirements of PAS 110 and storing the feed in a temporary or permanent memory structure. If an error is encountered during processing due to, for example, corrupt data, a malfunction within PAS 110 or for any other reason (step 215), then product approval utility records specific information regarding the error and issues a notification to an administrator as previously described (step 230). PAS 110 may further transmit a request for a new feed from supplier 155 in the case that the data from the original feed was corrupt (step 200).

Upon successfully receiving and processing a catalog feed, product approval utility identifies the source of the feed (step 220) by performing a search on the feed for identifying data such as, for example, a vendor name, identification number, contract number, requisition number and the like. In one embodiment, product approval utility 140 uses business rules to determine the status of the vendor. Status may include whether the supplier is an approved vendor, whether the enterprise has a contract with the vender along with any number of other indices regarding the price and service performance of the supplier.

Product approval utility 140 then uses a supplier identifier to send a request to an approved products database or procurement system for previously-approved catalog entries of the supplier (step 225). Upon receiving the supplier catalog corresponding to the feed supplier (step 235), product approval utility 140 parses the feed to extract individual items from the catalog feed (step 240). Those skilled in the art will appreciate that there are a number of methods for parsing a file such as, for example, searching the file for delimiters. Delimiters are commonly used to separate distinct values or sections of a file and may include any number of ASCII characters or combinations thereof.

As each item is extracted from the catalog feed, it is stored in pending database 145 or any other memory structure (step 245). Product approval utility 140 then requests a corresponding approved item from a catalog database and/or procurement system (step 250). Product approval utility 140 may use any identifier from the feed item to locate the approved item, however in an exemplary embodiment, a Stock Keeping Unit (SKU) number is used to ensure that the identical match is located. A SKU is the lowest level used to identify and track activity on an item. For example, to be able to place an order for a given style in colors red and black, in sizes small, medium, and large, each style/color/size combination will be assigned a different SKU number.

If an item matching a feed item is not found in a catalog database and/or procurement system (step 255), then product approval utility 140 adds a notation to the record of the feed item within pending database 145 (step 265) and proceeds to process the next catalog item (step 280). The notation may take any form and is intended to alert product approval utility 140 that the item is new because it does not currently exist in the catalog database and/or procurement system. If an item matching the catalog feed item is found (step 255), then product approval utility compares the catalog feed item with the database and/or procurement system item to determine if there has been a change in the price, description, delivery terms, payment terms and the like (step 260). Those skilled in the art will appreciate that there are a number of methodologies and commercial solutions employed to compare two or more data sets. Such solutions most often use pattern matching algorithms to map the character pattern of a first dataset to that of a second. Moreover, "matching" (or similar terms used herein) includes matching all information related to an item, matching a subset of information related to an item, substantially matching information, or any other rules or criteria for analyzing if certain information corresponds to other information. Similarly, a variance, change, or difference (or similar terms used herein), may include a partial or complete difference in a piece of data, a field, a style, a format, a composition and the like.

If a variance is found between the catalog feed item and its corresponding item from the database and/or procurement system, then product approval utility 140 adds a notation to the record of the feed item within pending database 145 (step 275). The notation may include any information relating to the variance and/or include both sets of data where the variance occurs. For example, a new catalog feed item consisting of an office chair has a price of $129.99. A corresponding item found within the procurement system and sharing the same SKU has a price of $119.00. Product approval utility 140 adds a notation to the item record within the pending database 145 that includes both the old and new prices. Those skilled in the art will appreciate that any number and methods of notation may be added to the item record in order to provide a procurement manager with adequate information for a proper policy decision. For example, the price difference used in the example above may be noted as a dollar value difference (e.g. +10.99) or as a percentage (e.g. +9%). Other pieces of information which may be included in the overall price difference calculation may include, for example, sales tax, shipping fees, return fees, payment terms, interest rate and the like.

If, while comparing the new and old item datasets, no variances are found (step 270), product approval utility 140 retrieves the next catalog feed item from pending database 145 (step 280). If the previous item was not the last item of the feed (step 285), then the item is processed similarly as described above starting with step 240 (step 296). PAS 110 repeats the steps of comparing new and old item datasets until there are no items remaining to be processed from the new catalog feed (step 285).

In another embodiment, product approval utility 140 also performs a reverse analysis of catalog items by determining whether each item associated with the supplier within a procurement system includes a corresponding item record in pending database 145 (step 292). If an item from the procurement system is not found in the new catalog feed (step 294), then product approval utility 140 includes a notation to the item record within pending database 145 (step 290). The notation may include, for example, any code or word that will make it clear that the item has been omitted from the supplier's new catalog. A procurement manager may later decide whether to delete the item from the procurement system or to allow it to remain.

When the processing of the new catalog feed has concluded (and/or any time during the process), product approval utility 140 notifies the appropriate procurement manager if any variance was found between the new catalog feed and the supplier catalog of the procurement system. Notification may be by way of, for example, email, telephone, pager or any other communication means discussed herein or known in the art. Moreover, the notification may include specific details regarding all of the variances found, or a simple message informing the manager that the manager should log into PAS 110 to review the variances.

In one embodiment, product approval utility 140 includes business rules to enable PAS 110 to automatically add, remove or hide items within the procurement system based on a new catalog feed. For example, a business rule may define an acceptable variance in price for an item falling within a defined value threshold. As such, an item falling within a value threshold of $150 to $180 may have an acceptable pricing variance of +1%. Therefore, for an item with a value of $160, where the new catalog feed lists a price that is 1.2% higher than the corresponding item in the procurement system, the product approval utility may automatically remove the item from the procurement system catalog. Those skilled in the art will appreciate that PAS 110 may employ any number of business rules relating to any type of variance to initiate any sort of action.

FIG. 3 is a flowchart illustrating an exemplary process for interacting with the system to review and authorize catalog variances. A procurement manager (or any other person, software and/or hardware given authority to manage supplier catalogs) connects with PAS 110 through any means known in the art (step 300). As used herein, "user" will be used to denote such a person. In one embodiment, user 100 connects to PAS 110 via a web client 105 with a network connection to a web server 120.

The invention may implement known methods for preventing access from unauthorized users such as, for example, requiring users to register and/or by assigning authentication credentials to individual users. In one embodiment, the invention includes an authentication server 125 which is incorporated to enforce security policies by allowing varying levels of access to users based on such policies. Internet security protocols such as, for example, methods of authentication and user management, are well known in the art, therefore the invention may employ any number of security architectures and an authentication process will not be described in detail herein.

Upon connecting, product approval utility 140 retrieves a list of catalog feeds from pending database 145 (step 305). The list may include any number of feeds requiring review of a user 100. Those skilled in the art will appreciate that a list may be compiled in any number of ways. For example, a list may include the supplier name, catalog name, date of the feed, number of variances, etc. Further, a list may include links to all variances irrespective of the identity of the supplier. User 100 selects from a list a variance, or set of variances, the user wishes to review. Product approval utility 140 retrieves the selected item(s) for display at web client 105, wherein user 100 reviews new catalog items, changed items and items that no longer exist in the new catalog feed (step 315).

Through a user interface to PAS 110, user 100 may be presented a number of options to affect the display and/or availability of the catalog item. User 100 reviewing an item variance may choose to approve or reject the item. If user 100 reviewing an item variance selects an option to reject the item, the item is removed from the pending database (step 325). However, if the item is approved (step 320), then the item remains in pending database 145 and user 100 may review additional catalog items. If there are additional items to review (step 330) then user 100 may repeat the steps above beginning at, for example, step 315. If no further items remain for review (step 330), then the catalog feed is scheduled for a next catalog build where all changes to the catalog will be implemented within the procurement system.

While FIG. 3 shows two options representing actions to take against a catalog item, other options may include "Make Invisible" and "Authorization Required". If user 100 chooses a "Make Invisible" option, for example, the item is not deleted from the catalog, but rather the item is only visible to the procurement manager. This enables the product to continue to be purchased, but only through the procurement manager. If user 100 selects "Authorization Required", then the item remains in the catalog, however a purchase cannot be executed through a purchasing system without authorization from a procurement manager. Those skilled in the art will appreciate that any number of additional options may be presented in order more closely manage catalog items and catalog item variances.

While the steps outlined above represent a specific embodiment of the invention, those skilled in the art will appreciate that there are any number of computing algorithms and user interfaces that may be applied to create similar results. The steps are presented for the sake of explanation only and are not intended to limit the scope of the invention in any way.

As will be appreciated by one of ordinary skill in the art, the invention may be embodied as a customization of an existing system, an add-on product, upgraded software, a standalone system (e.g., kiosk), a distributed system, a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interacts with PAS 110 to manage product catalogs for an enterprise. User 100 may be, for example, a commodity manager who defines and/or controls procurement policies for an enterprise. The commodity manager may interact with PAS 110 in order to determine which products and/or services will be visible to employees for internal purchasing. User 100 may interface with PAS 110 via any communications protocol, device or method discussed herein or known in the art. In one embodiment, user 100 may interact with the invention via an Internet browser at a web client 105.

Web client 105 may comprise any hardware and/or software suitably configured to facilitate input, receipt and/or review of any information related to PAS 110 or any information discussed herein. Web client 105 may include any device (e.g., personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with the PAS 110. For example, web client 105 may access the services of the PAS 110 through another server, which may have a direct or indirect connection to web server 120.

As those skilled in the art will appreciate, web client 105 may include an operating system (e.g., WINDOWS NT, 95/98/2000, OS2, UNIX, LINUX, SOLARIS, MACOS, etc.) as well as various conventional support software and drivers typically associated with computers. The web client 105 may include any suitable personal computer, network computer, workstation, minicomputer, mainframe or the like. Web client 105 can be in a home or business environment with access to a network. In an exemplary embodiment, access is through a network or the Internet through a commercially available web-browser software package.

Web client 105 may be independently, separately or collectively suitably coupled to the network via data links which includes, for example, a connection to an Internet Service Provider (ISP) as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, service oriented architecture, biometrics, grid computing and/or mesh computing.

Web server 120 may include any hardware and/or software suitably configured to facilitate communications between web client 105 and one or more PAS 110 components. Further, web server 120 may be configured to transmit data to web client 105 within markup language documents. Web server 120 may operate as a single entity in a single geographic location or as separate computing components located together or in separate geographic locations. Requests originating from client browser 105 may pass through a firewall 115 before being received and processed at web server 120. As used herein, "transmit" may include sending electronic data from one system component to another over a network connection. Additionally, as used herein, "data" may include encompassing information such as commands, queries, files, data for storage, and the like in digital or any other form. Web server 120 may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, ORACLE, SYBASE, INFORMIX MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789.98). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

In one embodiment, firewall 115 comprises any hardware and/or software suitably configured to protect PAS 110 components from users of other networks. Firewall 115 may reside in varying configurations including Stateful Inspection, Proxy based and Packet Filtering among others. Firewall 115 may be integrated as software within web server 120, any other system components or may reside within another computing device or may take the form of a standalone hardware component.

In one embodiment, applications server 135 includes any hardware and/or software suitably configured to serve applications and data to a connected web client 105. Like web server 120, applications server 135 may communicate with any number of other servers, databases and/or components through any means discussed herein or known in the art. Further, applications server 135 may serve as a conduit between web client 105 and PAS 110 and web client 105. Web server 120 may interface with applications server 135 through any means discussed herein or known in the art including a LAN/WAN, for example. Application server 135 may further invoke product approval utility 140 and/or report engine 150 in response to a user 100 request.

In one embodiment, report engine 150 includes any hardware and/or software suitably configured to produce reports from information stored in one or more databases. Report engines are commercially available and known in the art. Report engine 150 may provide printed reports, web access to reports, graphs, real-time information, raw data, batch information and/or the like. Report engine 150 may be implemented through commercially available hardware and/or software, through custom hardware and/or software components, or through a combination thereof. Further, report engine 150 may reside as a standalone system within PAS 110 or as a component of applications server 135 or web server 120.

In one embodiment, product approval utility 140 includes any hardware and/or software suitably configured to receive catalog feeds from a supplier and process such feeds to identify changes between new feeds and a corresponding approved catalog. Product approval utility 140 may exist as a standalone computing device or as a software entity stored within applications server 135 or web server 120. Product approval utility 140 may communicate directly or indirectly with one or more computing devices such as mainframe computers, for example. Further, Product approval utility 140 may include business rules such as, for example, definitions for acceptable price ranges, product purchase categories, suppliers, manufacturers, contract terms, purchase terms and the like.

In order to control access to web server 120 or any other component of the invention, web server 120 may invoke an authentication server 125 in response to submission of user 100 authentication credentials received at web server 120. In one embodiment, authentication server 125 includes any hardware and/or software suitably configured to receive authentication credentials, encrypt and decrypt credentials, authenticate credentials, and grant access rights according to user 100 pre-defined privileges attached to the credentials. Authentication server 125 may grant varying degrees of application and data level access to user 100 based on user information stored within member database 130.

In one embodiment, permission database 130 includes any hardware and/or software suitably configured to facilitate storing authentication and/or privilege information relating to users 100. Pending database 145 stores data relating to product and/or service items extracted from a catalog feed. One skilled in the art will appreciate that the invention may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to create, update, delete or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, JAVA, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method comprising:

receiving, by a computer based system for maintaining a procurement system, a catalog feed;

parsing, by said computer based system, said catalog feed into catalog items, each of said catalog items being individually procurable;

extracting, by said computer based system, a first item from said catalog items;

determining, by said computer based system, that said first item is distinct from each item in a set of items previously transmitted to said procurement system;

identifying, by said computer based system, a second item from said set of items previously transmitted to said procurement system, said second item being associated with said first item based on at least one correlating element;

comparing, by the computer based system, said first item to said second item;

identifying, by the computer based system, a variance between said first item to said second item;

comparing, by said computer based system, said variance to a predetermined threshold;

determining, by said computer based system, that said variance is at least one of within said predetermined threshold and outside said predetermined threshold, wherein said first item is at least one of automatically added to said procurement system in response to said variance being within said predetermined threshold and automatically hidden within said procurement system in response to said variance being outside said predetermined threshold;

requesting, by said computer based system, a status of said first item, in response to said variance being outside said predetermined threshold;

receiving, by said computer based system, said status from said first item, wherein said status changes the availability of said first item to at least one of available, not available, and invisible; and updating, by said computer based system, said procurement system based on said status.

2. The method of claim 1, wherein said first item is stored in a database.

3. The method of claim 1, wherein said second item is retrieved from a database.

4. The method of claim 1, wherein said comparing said first item to said second item further includes:

parsing said first item to extract a first field;

parsing said second item to extract a second field; and comparing said first field to said second field.

5. The method of claim 1, further including:

determining if said variance falls within a threshold defined by business rules; and modifying said second item based on said determining step.

6. The method of claim 1, wherein said identifying step further includes:

extracting data from said first item; and searching for said data in said second item.

7. The method of claim 1, wherein further including associating a description of said variance with said first item in response to said variance being outside said predetermined threshold.

8. The method of claim 1, further including removing said second item when said second item does not exist in said feed.

9. The method of claim 1, wherein said comparing said first item to said second item includes identifying said variance based on a difference between at least one of a title, description, cost, value, sales tax, interest rate, shipping term and payment term.

10. The method of claim 1, further including:
notifying a user that said first item requires review;
facilitating said review of said first item by said user;
receiving, from said user, an approval of said first item; and
modifying said second item based upon said approval.

11. The method of claim 10, wherein said notifying step includes notifying said user by at least one of email, telephone, pager and instant message.

12. The method of claim 10, wherein said modifying step includes at least one of removing and obscuring said second item.

13. A tangible computer-readable storage medium having computer-executable instructions stored thereon that, if executed by a computer based system for managing a procurement system, cause said computer based system to perform a method comprising:
receiving a catalog feed;
parsing said catalog feed into catalog items, each of said catalog items being individually procurable;
extracting a first item from said catalog items;
determining that said first item is distinct from each item in a set of items previously transmitted to a procurement system;
identifying a second item from said set of items previously transmitted to said procurement system that is associated with said first item based on at least one correlating element;
comparing said first item to said second item and identifying a variance;
comparing said variance to a predetermined threshold;
determining that said variance is at least one of within said predetermined threshold and outside said predetermined threshold, wherein said first item is at least one of automatically added to said procurement system in response to said variance being within said predetermined threshold and automatically hidden within said procurement system in response to said variance being outside said predetermined threshold;
requesting a status of said first item in response to said variance being outside said predetermined threshold;
receiving said status from said first item, wherein said status changes the availability of said first item to at least one of available, not available, and invisible; and
updating said procurement system based on said status.

14. A system for maintaining a procurement system comprising:
a network interface communicating with a memory;
said memory communicating with a computer based system for maintaining a procurement system, a catalog feed; and
said computer based system, when executing a computer program, is configured to:
receive a catalog feed;
parse said catalog feed into catalog items, each of said catalog items being individually procurable;
extract a first item from said catalog items;
determine that said first item is distinct from each item in a set of items previously transmitted to said procurement system;
identify a second item from said set of items previously transmitted to said procurement system, said second item being associated with said first item based on at least one correlating element;
compare said first item to said second item and identifying a variance;
compare said variance to a predetermined threshold;
determine that said variance is at least one of within said predetermined threshold and outside said predetermined threshold, wherein said first item is at least one of automatically added to said procurement system in response to said variance being within said predetermined threshold and automatically hidden within said procurement system in response to said variance being outside said predetermined threshold;
request a status of said first item in response to said variance being outside said predetermined threshold;
receive said status from said first item, wherein said status changes the availability of said first item to at least one of available, not available, and invisible; and
update said procurement system based on said status.

15. The method of claim 1, further comprising validating, by said computer based system, said catalog feed based at least in part on a catalog feed supplier.

16. The method of claim 1, further comprising extracting, by said computer based system, a first subset of items previously submitted to said procurement system based on an attribute of said catalog feed and that subset is compared to said feed, wherein said first subset is associated with a catalog feed supplier.

17. The method of claim 16, further comprising auditing, by said computer based system, said catalog feed, wherein said first subset of previously submitted items is compared to said catalog feed; and removing, by said computer based system, one item of said first subset of previously submitted items in response to said one item of said first subset of previously submitted items being not present in said catalog feed.

18. The method of claim 17, wherein in response to said removing step, said one item of said first subset of previously submitted items is re-categorized by said computer based system as at least one of an invisible item and an authorization required item.

19. The method of claim 1, wherein said variance is based on price.

20. The method of claim 1, further comprising validating, by said computer based system, said catalog feed based at least in part on catalog feed format.

* * * * *